April 13, 1954   G. WIGGLESWORTH   2,674,933
PHOTOGRAPHIC COPYING APPARATUS
Filed Nov. 17, 1947   2 Sheets-Sheet 1
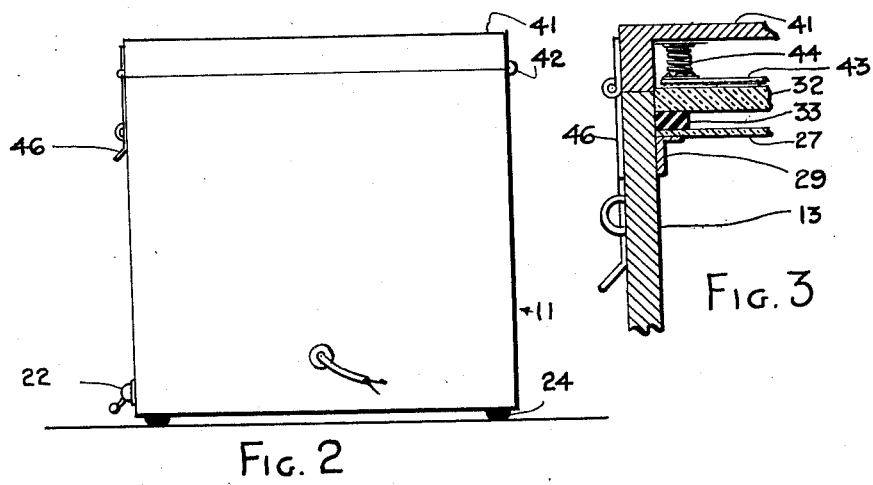
Fig. 2
Fig. 3
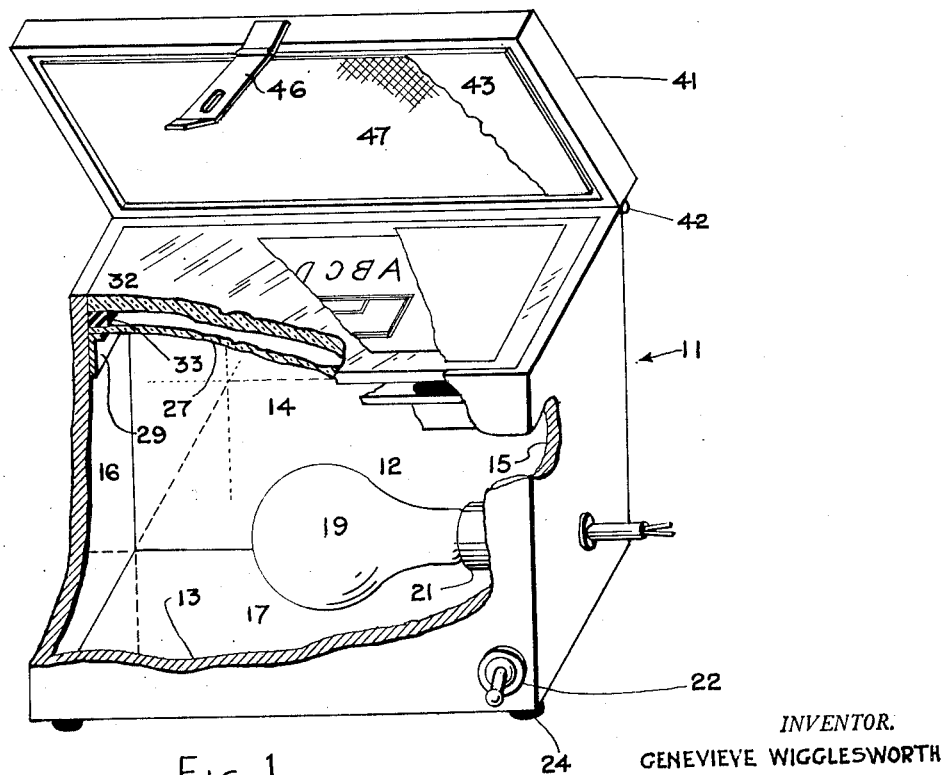
Fig. 1
INVENTOR.
GENEVIEVE WIGGLESWORTH
BY
Warren Dunlap Foster
Attorney April 13, 1954   G. WIGGLESWORTH   2,674,933
PHOTOGRAPHIC COPYING APPARATUS
Filed Nov. 17, 1947   2 Sheets-Sheet 2
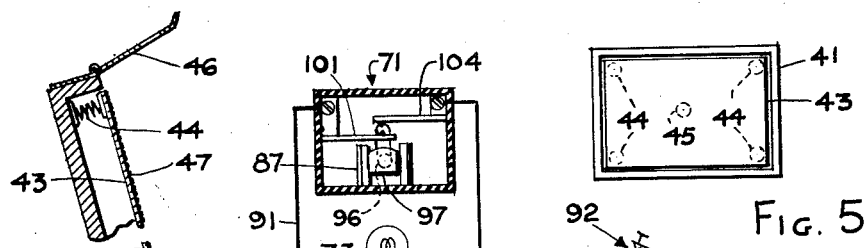
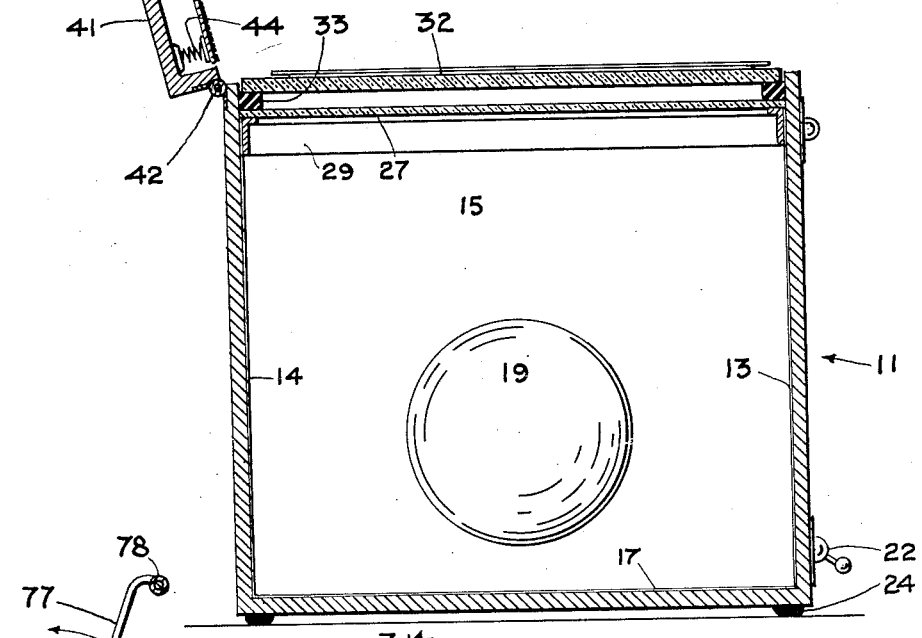
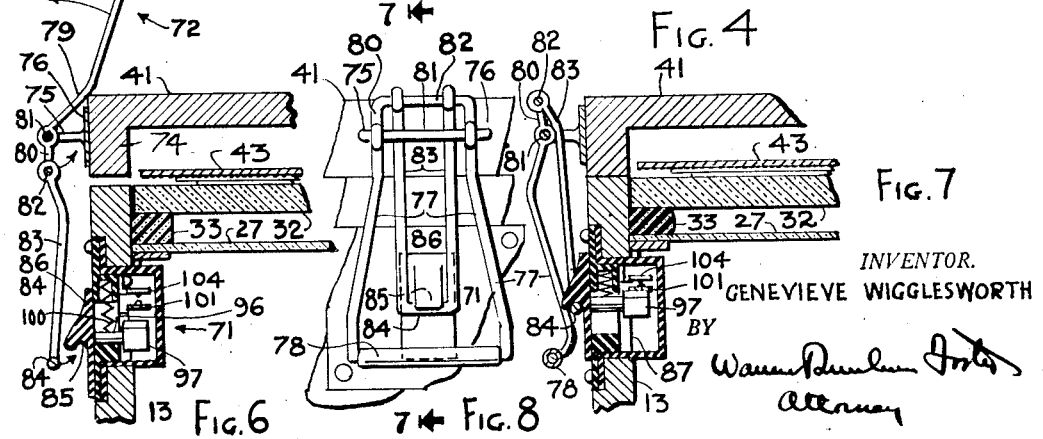
INVENTOR.
GENEVIEVE WIGGLESWORTH
BY
Warren Dunham Foster
Attorney Patented Apr. 13, 1954

2,674,933

UNITED STATES PATENT OFFICE 2,674,933

PHOTOGRAPHIC COPYING APPARATUS

Genevieve Wigglesworth, New York, N. Y., assignor to Foster and Foster, Ridgewood, N. J., a copartnership consisting of Warren Dunham Foster and Sigrid Foster Application November 17, 1947, Serial No. 786,357

20 Claims. (Cl. 95—73)

1

For many years three serious problems have beset manufactures of photographic copying devices. The first is to obtain close and even contact between the sheet or other object which is to be copied and the light sensitive surface such as photographic paper upon which the copy is to be made, the second is to secure an even distribution of light throughout the entire printing surface, and the third is to prevent fogging of the paper before or after exposure. The present invention solves all of these problems in an effective, simple and inexpensive manner. While my invention is particularly adapted for use in a machine for making photographic copies of a comparatively small size and is so illustrated it is not so limited.

My invention may be practiced by a lighttight box within which is disposed an ordinary frosted electric light as a source of illumination. The box has a hinged cover carrying a springsupported presser plate having a yielding engaging surface. As this cover is swung to position to close the box the presser plate is brought parallel to a sheet of heavy plate glass or other transparent plane surface which forms the platen and engages a sheet of photographic paper and document, drawings or other object to be copied which have been placed on the platen. Below this platen and spaced therefrom I mount a plane diffusing screen or surface which is translucent, which may be of the type known as "pearl glass." This surface is rigidly but preferably loosely supported in a position parallel to that of the platen. The transparent platen, however, is resiliently mounted, as I believe to be novel in the art. Its support is preferably afforded by a heavy rubber gasket which may rest upon the pearl glass. The presser plate carried by the cover is supported by a plurality of fairly powerful springs placed between it and the cover and carries a sheet of felt or the like which engages the photographic paper or object to be copied. The compressibility of the support for the platen is considerably less than that of the springs. I much prefer that this support be continuous; that it extends about the entire periphery of the platen.

To operate my device the user turns on the light, either by a manually operated switch or preferably by the novel automatic means of this invention, places the drawing or like transparent object to be copied upon the plate glass and light sensitive photographic paper upon the drawing. If, however, the drawing is opaque, the paper is, of course, placed first upon the glass emulsion side

2 up and the drawing upon the paper. Thereupon the user closes the cover and preferably latches it. After the exposure has been made for a sufficient length of time, the cover is released and the paper removed and developed.

An important and novel characteristic of my device results from the above described use of a rubber or other resilient support for the platen. I have found that the use of a spring pressed presser plate against a rigid surface gives improper contact or fails to give uniform contact between paper and the subject to be copied. Minor inequalities in the subject apparently have been responsible for this lack of continuous contact throughout the entire plane of the photographic paper. To overcome this defect, certain complicated and expensive devices have been put on the market. For example, contact may be secured by a vacuum device. Costly and timeconsuming mechanism exhausts the air from a chamber having, for example, a rubber surface against which the paper and the subject are placed. In this manner a fairly good contact often can be secured. After the exposure has been made this vacuum must be exhausted. In one machine widely sold this entire operation requires several minutes. I have often completed an exposure in my printing machine within three seconds, provided I use my own photographic paper "Instaprint" which has rapid emulsion which makes such speed possible. The reason for securing these excellent results with my machine is that the transparent platen against which a presser plate is opposed "floats," as it were, in the machine. There is sufficient compression of the resilient support to permit equalization of minor inequalities of such paper or mechanism.

I solve the second serious problem noted above in an equally simple and inexpensive manner. I preferably use a single light source in a light chamber having highly reflective sides and bottom. I so relate the position of this light source to the position of these reflecting surfaces that more light is reflected to the outer portion of the printing surface than to the central portion. The central portion being nearer to the source of light receives more direct light. The outer portions receive reflected light additional to that directed to the center to compensate for what otherwise would be greater brilliance at the center.

I have found that this result can be accomplished by observation of certain relative measurements which are critical within rather broad ranges preferably together with the spacing of the transparent platen and the diffusing screen and the use of a single froster source of light. It will be noted that I place the diffusing screen at a considerable distance from the platen but in a fixed relation to the distance of the source of light from the screen. If one takes a value of 10 as that of the length of the printing surface (the other dimension being of the order of between 8 and 12), I have found that the above results can be secured by centrally disposing a single source of light with the envelope thereof at its nearest point at a value of approximately 5 from the printing surface. Since the envelope has a diameter of a value of approximately 4 and is centrally disposed the distance between the outside diameter of this envelope and the side walls has a value of approximately 3. In a machine which has proved an effective embodiment of my invention the distance between the relatively distant surfaces of transparent platen and diffusing screen has a value of 1. It is particularly to be noted that the above values are to be considered only as approximate although in practice they have proved very effective. I have found that a tolerance of plus 50% or minus 25% in any measurement does not defeat this aspect of my invention. I am considering the light source from the standpoint of a vertical section normal to the feed wires taken at the widest point of the envelope, or, when appropriate, from the extremity of the envelope opposite the base. If the printing surface is not substantially square, or completely defined, its value is to be considered as the length of its longest side.

It has been common in this art to make and break a circuit to a light source by means of relative movement toward and away from each other of a presser plate and a platen. For certain types of printing this arrangement has proved convenient but when very rapid paper is used or an operator is inclined to be careless or is inexperienced such automatic mechanism may defeat its own purpose by starting an exposure before paper and copy are in fixed relation. Also, if the printing light is turned off following relative movement between platen and presser plate it is likely that there is relative movement between copy and photographic paper while the printing light is still effective. To remedy the poor printing results caused by such a condition I may close the circuit to my printing light only after platen and presser plate have been firmly locked together and I break this circuit before there can be relative movement between paper and copy. I operate a switch to the printing light by a latch which holds the presser plate in immovable relation to paper, copy and platen. By reason of this construction there cannot possibly be relative movement while the printing light is operative.

The objects and characteristics of my invention will have been made apparent from the preceding general portion of this specification and will be made more evident as the description proceeds. They include the provision of a photographic copying apparatus wherein close and even contact between the copy and the print are obtained, light is evenly diffused and the printing light is effective only during such time as paper, copy and apparatus are tightly locked in operative condition. It will be readily understood, however, that changes can be made in the constructions which are shown purely for purposes of illustration without departing from the spirit of my invention or the scope of my broader claims.

In the drawings:

Figure 1 is a perspective view partly in section and partly broken away taken from the front of my instrument showing the cover open and a drawing to be copied and a sheet of paper in position to be printed.

Figure 2 is an end elevation of the subject matter of Figure 1.

Figure 3 is an enlarged fragmentary sectional view corresponding to Figure 2 and showing details of the mounting of presser plate and platen.

Figure 4 is a vertical section of my device with the cover open.

Figure 5 is a reduced top plan view.

Figures 6, 7, 8 and 9 illustrate a variant of my device wherein I automatically close and open a circuit to a printing light as a cover carrying a presser member is latched and unlatched respectively.

Figure 6 is an enlarged, fragmentary sectional view showing the cover in unlatched position and a circuit of a light source broken.

Figure 7 is a similar sectional view taken on the line 7—7 Figure 8 and looking in the direction of the arrows showing the cover latched and the circuit completed.

Figure 8 is a fragmentary, side elevation corresponding to Figure 7.

Figure 9 is a wiring diagram.

In the following portion of this specification and in the subjoined claims orientation is from the standpoint of a user of my photographic copying apparatus in the position shown in Figures 1, 2, 3, 4, 6 and 7 hereof, that is to say, in operative position with a user facing the apparatus. For example such words as "above" and "upper" or "upwardly" and "below" "lower" and "downwardly" and the like are from the standpoint of the printer ready for use. Also, such words as "forward" mean in a direction toward the user and "backward" or the like mean in a direction away from the operator. For convenience I have used the word "copy" to mean any object, generally but not necessarily a drawing, document, letter, page of a book or the like, in sheet form which is to be copied. Also for convenience I have used "photographic paper" or "paper" to mean any light sensitive paper, film, cloth or other substance upon which by means of light or other radiation an image may be implanted.

In carrying out my invention I supply a boxlike structure 11 having light chamber 12 with reflecting front and back walls 13 and 14 respectively and reflecting side walls 15 and 16. The bottom surface 17 is also covered with a reflecting medium. I prefer to use a reflecting coating which is very efficient. An ordinary frosted incandescent bulb 19, for example of 40 watts, is supported by a socket 21 attached to side wall 15 of the light chamber. This lamp is shown as controlled by a switch 22 but preferably a corresponding switch may be automatically operated by the latching and unlatching of the cover as is later described. The box is shown supported by rubber buttons or the like 24.

At the top of the light chamber and parallel to its bottom wall I place a diffusing screen 27. I have found so-called "pearl glass" effective. The screen which I have used most satisfactorily is of a milky white appearance and is translucent. I support this screen by a rigid bracket 29. Preferably the screen is merely placed loosely upon the bracket and does not fit tightly against the edge of the box so that it readily can be removed. Above the bracket I place a plate glass or other plane transparent sheet 32 which serves as a platen or fixed printing surface. The edges of this sheet rest loosely upon a rubber gasket 33 which in turn rests loosely upon the top periphery of the screen. I have used very successfully a heavly and dense rubber which can be compressed to a substantial degree but only under considerable pressure. It will thus be seen that the transparent printing surface or platen 32 rides loosely or floats above and parallel to the diffusing screen. The platen is also slightly smaller than the opening in which it fits. Thus slight tilting movement of both surfaces, as well as their easy removal, is permitted.

The color range of my own paper "Instaprint" is so wide that a color filter is not necessary. With other papers which do require a filter, such a sheet may be placed loosely and removably above the diffusing screen and below the rubber gasket. Although this printer was particularly intended for "Instaprint" papers, any suitable photographic paper may be used herewith.

Cover 41, which fits tightly when closed, is attached as by hinges 42, which may be of the piano type, to the back wall 14 of the box. Upon the inside surface a presser pad is mounted as by four springs 44, set adjacent each corner of the presser member, and one central spring 45, as shown in Figure 5. A conventional hasp 46 may be used to latch the cover into closed or printing position, but see Figures 6 to 9 both inclusive for my preferred construction which is later described.

A sheet 47 of felt or other heavy and slightly compressible material is attached to the surface of the platen which engages the printing paper or the copy. Instead of felt rubber or sponge rubber may be used, but I prefer a relatively dense and slightly resilient material of less compressibility than that of the springs and slightly less than that of the support for the platen. It will be particularly noted that four of the springs for the presser plate are disposed opposite the edges of the platen and not far from a point opposite that at which the platen engages the supporting rubber gasket. It is important that these points be comparatively close to the resilient mounting 33 by means of which the glass plate floats in the box. I may omit central spring 45, and, if desired, the felt or other covering.

The second important object of my invention is even illumination obtained by a critical arrangement of parts, optically considered, and need not be further discussed since already fully presented in the introductory portion hereof.

Also as stated in the introductory portion of this specification under many conditions particularly to prevent fogging a printing paper with a rapid emulsion, I may prefer to operate the printing light automatically by the latching and unlatching of the presser plate in fixed relation to the platen and the copy and the photographic printing paper therebetween. In the apparatus by which I illustrate my invention I show this latch as one for the cover and an enclosing casing but in a copying machine operating in a dark room or for other reasons without a casing it may be applied directly to platen and presser plate. A construction which accomplishes this desirable and, I believe, novel result is clearly shown in Figures 6 to 9 inclusive hereof. For the reasons stated in the introductory portion of this specifiction this construction should not be confused with the operation of a switch by the movement of a presser plate. Such a device is useful in speeding a printing operation but it does not prevent fogging.

A switch generally indicated as 71 is operated by a latch generally indicated as 72 to control a printing light 73 (Figure 9). This latch consists essentially of two connected rods, or control members, each bent into a four-sided irregular lever, as will be apparent from Figures 6, 7 and 8. This latch has certain of the characteristics of a toggle. A U-shaped attaching member 75 supported upon plate 76 fixed to a depending wall 74 of the cover 41 in a manner later described serves as a mount for this first lever. A horizontal cross bar joining the vertical legs 77 of this first member is surrounded by a handle 78 which is relatively long so that it may be very easily operated without the use of the fingers. That is, in order to speed a printing operation, a user may control it with an elbow or the palm of the hand. It is not necessary to grasp the handle with the fingers. Each vertical portion of this four-sided bent rod includes an intermediate section 79 which as seen in Figures 6 and 8 is slightly bent or offset in relation to the cross bar which carries the horizontal member. A downward extension of the rod as viewed in Figures 6, 7 and 8 ends in a terminal portion 80 which is offset in a direction contrary to that of the intermediate portion. At the junction of these intermediate and terminal portions this first double-sided lever is pivoted upon horizontal cross bar 81 of the U-shaped attaching member 75 previously mentioned. This first generally quadrilateral lever is completed by an operating horizontal cross bar 82 parallel to that which bears handle 78 and connected with a second double-sided lever. This second lever is in the form of a U-shaped bent rod, having vertical legs 83 and a latching cross bar 84.

The upper ends of these legs as viewed in the figures are bent about cross bar 82 and form the operating connection between the levers. This latching cross bar upon rotation of rod 77 in a counter-clockwise direction is brought to the right and upwardly, all as viewed in Figures 6 and 7 and into engagement with a notch 85 in an operating slide 86 of the switch generally indicated as 71. This operating slide working in guides 87 then moves upwardly along the outer surface of wall 13 of the printing box and completes circuit 91 which feeds lamp 73. This circuit may also be broken by a manually operated switch 92. When my printing device is not in use switch 92 is left open to render it completely inoperative.

Slide 86 carries an inward strut 96 and an operating block 97 mounted thereon which works against a spring 100. Thus, as the latching cross bar 84 is moved downwardly, spring 100 immediately returns the slide and switch from the position shown in Figure 7 to that shown in Figure 6 thereby breaking the circuit. The circuit is completed when block 97 presses upwardly against resilient contact bar 101 thereby moving it upwardly against resilient contact bar 104. I prefer to make both of these contact bars resilient to allow for differences in thickness of paper and copy. I also prefer to add a light break not shown between the depending walls 74 of cover 41 and the walls of the body of the box.

The advantages of my invention will have been made evident from the foregoing specification and will be apparent from the sub-joined claims.

They include the provision of photographic copying or printing apparatus by means of which clear, distinct, exact and acceptable photographic prints can be made with a minimum of time and trouble and a maximum of certainty of good results.

I claim:

1. In a photographic copying apparatus, an enclosing casing, a transparent platen, a first resilient floating mount upon which said platen is bodily movable or floats as a whole within said casing, a presser plate movable from and to operative and parallel relation to said platen for holding copy and a sheet of photographic paper in fixed and parallel relation to said platen, a second resilient floating mount upon which said presser plate bodily moves or floats as a whole, and a source for passing light from said copy to said paper.

2. In a photographic copying apparatus, an enclosing casing, a transparent platen, a first resilient mount upon which said platen bodily moves or floats as a whole within said casing, a presser plate movable from and to operative and parallel relation to said platen for holding copy and a sheet of photographic paper in fixed and parallel relation to said platen, a second resilient mount upon which said presser plate bodily moves or floats as a whole within said casing, the compressibility of said first resilient mount being less than that of said second resilient mount, and a source for passing light from said copy to said paper.

3. In a photographic copying apparatus, an enclosing casing, a transparent platen, a first resilient mount upon which said platen is bodily movable or floats as a whole within said casing, a presser plate movable from and to operative and parallel relation to said platen for holding copy and a sheet of printing paper in fixed and parallel relation to said platen, a resilient pad upon the side of said plate engaging said platen, a second resilient mount upon which said presser plate bodily moves or floats as a whole within said casing, the compressibility of said first resilient mount and of said pad being less than that of said second resilient mount, and a source for passing light from said copy to said paper.

4. In a photographic copying apparatus, an enclosing casing, a transparent platen, a presser plate movable from and to operative and parallel relation to said platen for holding copy and a sheet of photographic paper in fixed and parallel relation thereto, a plane diffusing screen, a rigid mounting for holding said screen parallel to said platen and spaced therefrom upon the side thereof opposite that which is engaged by said presser plate, a first resilient mount for said presser plate for resilient engagement with said platen, a second resilient mount for said platen so that when it is engaged by said presser plate it is subject to movement in relation to said diffusing screen, the compressibility of said first resilient mount being greater than that of said second mount, and a source for passing light through said diffusing screen and said platen and from said copy to said paper.

5. In a photographic copying apparatus, an enclosing casing, a transparent platen, a first resilient mount upon which said platen is supported adjacent its edges and bodily floats within said enclosing casing, a presser plate, a second resilient mount upon which said presser plate is supported adjacent its edges and bodily floats within said casing, means for causing relative movement between said presser plate as a whole and said platen as a whole whereby a sheet of photographic paper and copy may be pressed into intimate and parallel relation with each other and with said platen and said presser plate thereby operating said apparatus, said first and second resilient mount being opposite each other when said apparatus is operated, and a source for passing light through said platen and from said copy to said paper.

6. In a photographic copying apparatus, an enclosing casing, a transparent platen, a rubber gasket positioned within said casing and engaging the edges of said platen therebelow for supporting it within said casing for bodily movement as a whole, a presser plate, a support for said presser plate, means for causing relative movement between said support and said platen for holding photographic paper and copy therebetween, and springs for attaching said presser plate to said support at the edges of said presser plate for bodily movement as a whole in relation to said casing, the edges of the sides of said platen and said plate which are opposite those which are so supported engaging each other when said platen and said presser plate are in operative relation, and a source for passing light through said platen and from said copy to said paper engaged thereby whereby the apparatus is operated.

7. In a photographic copying apparatus, a box, said box having at least one flat wall, a source of light disposed in said box spaced from said wall, a rigid support for mounting a diffusing screen parallel to said wall and upon the side of said source of light relatively distant from said wall, a diffusing screen mounted upon said rigid support and freely removable therefrom, a rubber gasket resting upon the edges of said diffusing screen upon the side thereof relatively distant from said source of light, a plane transparent rigid platen loosely placed upon said gasket upon the side thereof opposite to that which rests upon said diffusing screen whereby said platen is bodily movable as a whole within said box, a cover hinged to said box along an edge thereof and having a top surface movable to and from a position parallel to said wall and to said platen upon the side thereof relatively distant from said diffusing screen, a rigid presser plate, a slightly compressible pad mounted upon the working side of said presser plate relatively adjacent said platen when said cover is closed, and springs for mounting said presser plate within said cover upon the side thereof relatively adjacent said platen when said cover is closed whereby said presser plate is bodily movable as a whole within said cover, said springs being attached to said cover upon the side thereof relatively adjacent said cover.

8. In a photographic copying apparatus, a box having a horizontal bottom wall and vertical side walls, a cover hinged to the top of one of said vertical side walls and movable to and from a position wherein it completes the enclosure of the body of said box, a light source mounted within said box near said bottom wall, a transparent diffusing screen, a rigid horizontal support upon said side walls for mounting said screen by engagement with its periphery adjacent but spaced from the top of the body of said box and parallel thereto, said screen resting loosely upon said support so that it may be freely removed from the body of the box, a rubber gasket resting loosely upon the outer and upper periphery of said diffusing screen, a transparent rigid platen loosely placed upon said gasket above said screen, said platen also being freely removable from the body of said box when said cover is open and when said cover is closed being supported by said gasket for bodily movement thereon, said cover being movable from and to a position above and parallel to said platen, a presser plate, springs for resiliently mounting said presser plate within said cover and parallel and in engagement with said platen when said cover is closed, said presser plate thereby being bodily movable, light from said source passing from said source through said diffusing screen and said platen and from copy placed between said platen and said presser plate to a sheet of photographic paper also placed therebetween.

9. In a photographic copying apparatus, a box, said box having a horizontal bottom flat wall and four vertical side walls, a source of light having a circuit and disposed in said box and spaced above said bottom wall, a rigid support for mounting a diffusing screen parallel to said bottom wall disposed horizontally above the interior of at least two of said side walls and upon the side of said source of light relatively distant from said bottom wall, a diffusing screen mounted loosely upon said rigid support and freely removable therefrom, a rubber gasket resting loosely upon the periphery of said diffusing screen upon the side thereof relatively distant from said source of light, a plane transparent platen loosely placed upon said gasket upon the side thereof opposite to that which rests upon said diffusing screen, a cover hinged to one of said vertical walls along a top edge thereof, said cover having a top surface parallel to said bottom wall when said cover is closed and having depending side walls, said cover being movable to and from a position parallel to said bottom wall, a presser plate, a resilient pad attached to the bottom side of said presser plate, springs for mounting said presser plate within said depending side walls of said cover and parallel to said top wall of said cover, said springs extending from the sides of said cover relatively remote from said platen to said top wall, the compressibility of said springs being greater than the compressibility of said gasket, said presser plate and said platen when said cover is closed thereby resiliently engaging a sheet of photographic paper and copy placed therebetween, a switch disposed within said circuit of said light source for controlling said circuit, said switch comprising contact points, a resilient mount for each of said points, a slide mounted upon one of said vertical side walls of said box, a formation extending from said slide to the interior of said box for supporting one of said mounts for movement toward the other of said mounts as said slide is moved toward latching position thereby moving its contact into operative relation with the other thereof, said slide embodying a latching formation exteriorly thereof, a compression spring for moving said slide to a position wherein said contacts are out of engagement with each other, a latching member mounted upon said cover, said latching member having a movable formation dimensioned and positioned for engagement with said formation of said slide whereby when said latching member is moved to latching position it engages said formation and moves said slide against the power of said spring so that said circuit is closed when said cover is thereby latched to said box and said platen and said presser plate brought into operative or printing relation to each other, said compression spring and the resilience of said contact mounts forming a lost motion device to compensate for differences in the position of said slide when said cover is latched to accommodate different thicknesses of objects successively placed between said platen and said presser plate and also serving to move said slide to unlatched position thereby allowing the resilience of said mounts to break the circuit to said light source when said movable formation of said latching member is removed from said formation of said slide prior to the opening of said cover.

10. In a photographic copying apparatus in the form of a box, a platen plate, a resilient mount for said plate upon which it is bodily movable or floats as a whole, a presser plate, a resilient mount for said presser plate independent of said first mentioned mount upon which said presser plate is bodily movable or floats as a whole within said box, means for causing relative movement between said plates to bring said plates into close and parallel relation to each other and to a sheet of photographic paper and copy placed therebetween, the effectiveness of the resilience of said mounts of said plates not being destroyed by said movement, a light source having a circuit for illuminating said platen plate and passing light from said copy to said paper, a latch mounted for movement with said presser plate for holding said plates together, a switch for said circuit, and a connection between said latch and said switch for operating said switch by said latch, said latch and said connection embodying lost motion devices which accommodate said resilience of said mounts without materially affecting it or the position of said plates and also accommodates differences in thickness of successively inserted sheets of photographic paper and copy.

11. In a photographic copying apparatus having a box, a cover for the body of said box movable to a position wherein it completes the enclosure of said box, a platen mounted within said box, a presser plate therewithin, an electrical light source including a circuit within said box, and an operable latching member mounted upon said cover and bodily movable therewith; in combination, two aligned switch contacts in said circuit, a resilient mount for at least one of said contacts and a slide mounted upon a wall of the body of said box, said slide having a formation exterior to said box for engagement by said movable latching member which upon movement thereof by said member latches said cover to said body of said box and a formation interior thereto which upon movement by said member, engages and moves one of said contacts into operative engagement with the other thereof thereby closing said circuit as said cover is latched.

12. In a photographic copying apparatus having a box, the body of said box having a bottom horizontal wall and upright side walls, a cover for the body of said box, said cover having a horizontal top wall and depending side walls joining said side walls of the body of said box when said cover is moved to closed position, one of said side walls of said body of said box and one of said depending walls of said cover being hingedly connected to each other, a platen mounted within the body of said box adjacent and parallel to the top thereof, a presser plate mounted within the depending walls of said cover, said platen and said plate being brought into close and parallel relation to each other and into contact with a sheet of photographic paper and copy when said cover is closed, an electrical light source including a circuit within said box, each leg of said circuit being connected to a contact member within said box, a movable latching member mounted upon said cover adjacent the depending side thereof which is opposite that which is hinged to the body of said box; in combination, a guideway in that one of said side walls of said box opposite said side wall to which said depending wall of said cover is hinged, a slide movable in said guideway, said slide having an exterior latch-receiving formation and interior contact-moving formation, at least one of said contact members within said circuit being flexible and so disposed that upon engagement by said contact-moving formation it is brought into engagement with said other contact member, a compression spring for moving said slide to one end of said guideway and removing said contact-moving formation from operative relation to said contact member, said latching member having a formation adapted to engage said latch-receiving exterior formation of said slide whereby upon such engagement and movement of said latching member said slide is moved against the power of said spring by the movement of said latching member, said exterior formation of said slide and said latching member being so dimensioned and disposed that said formations are brought into operating engagement with each other by a first portion of the movement of said latching member, whereby after said cover has been closed it is latched to said box and said circuit to said source of light is thereupon closed, said spring being effective to break said circuit after said formations have been separated by a contrary movement of said latching member, said compression spring also being effective to compensate upon the closing movement of said latch for differences in thickness of successive objects placed between said platen and said plate.

13. In a photographic copying apparatus, an enclosure with a body having a bottom wall and upright enclosure wall, the interior of said walls being reflective, a movable cover for said enclosure, a presser plate resiliently mounted within said cover for movement therewith, a transparent platen plate resiliently mounted in the body of said enclosure for engagement with said presser plate when said cover is moved to a position wherein it completes said enclosure, copy and a photographic paper being engageable therebetween when said cover is closed, the length of said platen and said presser plate having a value of the order of 10, a light source having a circuit for illuminating said platen, said light source being disposed within said enclosure at a distance of a value of the order of 5 from said platen and between it and said bottom wall and being disposed at a distance of the order of 3 from at least three of said side walls, a first latch member mounted upon said cover for bodily movement therewith and in relation thereto, a mounting for a second latch member upon the body of said enclosure for movement relatively thereto, a lost motion device embodied within said mount, said second member having a formation for the reception of a portion of said first latch member engageable therewith, said first member being formed with such a portion, a switch including two contacts for said circuit, a resilient mounting for at least one of said contacts, and an operating connection between said second latch member and one of said contacts for moving said contact toward and into engagement with said other contact upon the movement of said latch to latching position illuminates said platen when said presser and platen plates are latched together, said lost motion device and the resilience of said mounting of said contacts compensating for differences of thickness between successive objects which are placed between said resiliently mounted plates, said resilient mounting of said plates providing close contact between print and paper and said positioning of said light source providing the even illumination also necessary for optimum quality in a finished print.

14. In a photographic copying apparatus having a platen plate, a support for said platen plate, a presser plate, one of said plates being resiliently mounted and said presser plate being movable relatively to said platen plate for the introduction of a sheet of photographic paper and an object to be copied, and a light source having a circuit for illuminating said platen; in combination, a first latching member mounted for movement with said presser plate, a second latching member in the form of a slide mounted for limited movement in said support, said slide having an exterior detent formation for the reception of said first latching member and an interior switch operating formation, a compression spring for moving said slide away from said platen plate, said compression spring when said first latching member is connected to said slide furnishing compensation for the difference in thickness in objects and photographic paper successively inserted between said plates, said circuit including switch contacts, mounts for said contacts at least one of which is resilient, said mounts being so disposed that when said second latching member is moved upon the latching of said plates said contacts are brought together, the resilience of said mount furnishing a lost motion device compensating for such differences in thickness, said compression spring after said latching members are separated also moving said switch contacts apart thereby breaking the circuit of said light source.

15. In a photographic copying apparatus, a casing, a platen plate and a presser plate within said casing, a resilient mounting for at least one of said plates, said plates being adapted for relative movement whereby copy and a sheet of photographic paper may be held in printing relation therebetween, a cover movable to and from a position wherein it encloses said casing, an electric light source including a circuit within said casing for illuminating said copy and said paper, and a latch for holding said cover fixed to said casing, said latch including a first latch member attached to said cover and movable therewith and relatively thereto and a second latch member engageable by said fixed member and mounted for movement relative to a wall of said casing, two switch members disposed in said circuit, one of said switch members being resilient, one of said switch member being movable by said second latch member when it is engaged by said first latch member into engagement with said other switch member whereby the movement of said latch to locking position closes said circuit, the resilience of said switch member accommodating the resilience of said mounting and differences of thickness of successively inserted copy and photographic paper.

16. In a photographic copying apparatus, an enclosing casing, a platen plate mounted at the top of said casing, a cover for said casing, a presser plate mounted within said cover and engageable with said platen plate when said cover is closed, the closing of said cover holding copy and a sheet of photographic paper in printing relation, an electric light source including a circuit within said casing for illuminating said platen and said copy and said paper, a latch including a first latch member and second latch member, said first latch member being mounted upon said cover and said second latch member being mounted upon said casing and said members being engageable with each other upon the closing of said cover, the mounting of said second latch member providing movement thereof in one direction by the closing of said latch, a spring providing movement of said second latch member in the other direction when said latch is released, and a resilient member engageable by and movable with said second latch member for opening and closing said circuit.

17. In a photographic copying apparatus, a relatively fixed platen plate, a presser plate for holding copy and a sheet of photographic paper against said platen plate, a resilient mount for at least one of said plates a light source having a circuit for exposing said paper to said copy, an operable latch for holding said presser plate in fixed relation to said copy and said paper, a switch for closing and opening said circuit, a movable detent member mounted upon said apparatus for movement relative thereto after engagement by said latch, a spring resisting movement of said detent member against the power of said latch thereby to hold said latch in latching position irrespective of the exact location of said detent, the length of travel of said detent being greater than the minimum dimensions of said copy and said sheet of photographic paper thereby permitting the use of thicker copy and thicker photographic paper, and a resilient connection between said detent member and said switch for operating said switch irrespective of the exact position of said detent member along its path of latching travel.

18. In a photographic copying apparatus, an enclosing casing, a platen in the top of said casing, a cover for said casing, a presser plate mounted within said cover and movable therewith, toggle jointed latch arms mounted upon said casing for bodily movement therewith and rotational movement relatively thereto, a latch engaging slide mounted upon said casing for vertical movement along a wall thereof when engaged by an arm of said toggle, such engagement being effective to lock said cover to said casing, an electric light source including a circuit within said casing for illuminating said platen and said copy and said paper, a switch for said circuit, and a connection including a lost motion device between said switch and said latch receiving slide for operating said switch upon the movement of said toggle.

19. In a photographic copying apparatus, an enclosing casing, a platen plate mounted in the top of said casing, a cover for said casing, a presser plate mounted within said cover, the mounting for at least one of said plates being resilient, a latch, said latch including two pairs of parallel long arms joined by cross arms, a pivotal connection between said long arms, a pivotal mounting for a first of said pairs of long arms relatively near their connection with said other or second pair of long arms, said pivotal mounting being upon a horizontal axis and being fixed to said cover for bodily movement therewith, a latch receiving slide mounted upon an upright wall of said casing, said slide having a formation for the reception of a cross arm of said second pair of long arms and being movable therewith, a source of electric light including a circuit for illuminating said platen, a switch for said circuit, and a connection between said slide and said switch for making and breaking said circuit upon the operation of said latch.

20. In a photographic copying apparatus having a platen plate, a presser plate, a resilient mount for at least one of said plates, means for causing relative movement between said plates, and a light source having a circuit for illuminating said platen; in combination, a latch mechanism for holding said plates together, and a switch mechanism for said circuit, said switch mechanism including two contacts, a resilient mount for at least one of said contacts, and said latching mechanism embodying a detent member having a path of travel longer than that represented by the minimum thickness of a copy and a sheet of photographic paper placed between said plates, said mechanism also embodying a latching member movable with one of said plates and having a formation thereon which engages said detent member, a spring resisting the movement of said detent member when so engaged, and a formation upon said movable detent member which engages said resilient contact and moves it into engagement with said other contact thereby completing said circuit thereby operating said switch by said latch irrespective of the thickness of objects which have been placed between said plates and the position of said detent member within its latching range.

References Cited in the file of this patent

UNITED STATES PATENTS

| Number | Name | Date |
|---|---|---|
| 917,696 | Waltmer | Apr. 6, 1909 |
| 1,031,906 | Blodgett | July 9, 1912 |
| 1,093,509 | Weidner | Apr. 14, 1914 |
| 1,159,955 | Kittredge | Nov. 9, 1915 |
| 1,230,532 | Sterling | June 19, 1917 |
| 1,463,009 | Dye | July 24, 1923 |
| 1,809,238 | Hopkins | June 9, 1931 |
| 1,930,139 | Altman et al. | Oct. 10, 1933 |
| 1,947,795 | Post | Feb. 20, 1934 |
| 2,200,719 | Morgan | May 14, 1940 |
| 2,224,839 | Steiner | Dec. 10, 1940 |
| 2,254,717 | Weiss | Sept. 2, 1941 |
| 2,272,646 | Schmidt et al. | Feb. 10, 1942 |
| 2,298,097 | Polhemus | Oct. 6, 1942 |

FOREIGN PATENTS

| Number | Country | Date |
|---|---|---|
| 861,570 | France | Oct. 28, 1940 |